(12) United States Patent
Chai

(10) Patent No.: US 9,175,105 B2
(45) Date of Patent: Nov. 3, 2015

(54) COPOLYMERS

(75) Inventor: Choon Kool Chai, Overijse (BE)

(73) Assignee: INEOS SALES (UK) LIMITED, Lyndhurst, Hampshire (GB)

( * ) Notice: Subject to any disclaimer, the term of this patent is extended or adjusted under 35 U.S.C. 154(b) by 0 days.

(21) Appl. No.: 11/919,796

(22) PCT Filed: May 5, 2006

(86) PCT No.: PCT/GB2006/001675
§ 371 (c)(1),
(2), (4) Date: Nov. 2, 2007

(87) PCT Pub. No.: WO2006/120418
PCT Pub. Date: Nov. 16, 2006

(65) Prior Publication Data
US 2009/0082531 A1    Mar. 26, 2009

(30) Foreign Application Priority Data
May 10, 2005  (EP) ..................... 05252850

(51) Int. Cl.
| | | |
|---|---|---|
| *C08F 210/16* | (2006.01) |
| *C08F 210/02* | (2006.01) |
| *C08F 210/08* | (2006.01) |
| *C08F 4/76* | (2006.01) |

(52) U.S. Cl.
CPC ............... *C08F 4/76* (2013.01); *C08F 210/16* (2013.01)

(58) Field of Classification Search
CPC ..... C08F 210/02; C08F 210/08; C08F 210/16
USPC .......................................... 528/346; 526/346
See application file for complete search history.

(56) References Cited

U.S. PATENT DOCUMENTS

| | | | | |
|---|---|---|---|---|
| 5,281,679 | A * | 1/1994 | Jejelowo et al. | 526/114 |
| 6,531,520 | B1 * | 3/2003 | Bambara et al. | 521/50 |
| 6,684,910 | B2 * | 2/2004 | Stoffelsma et al. | 138/137 |
| 6,734,267 | B2 * | 5/2004 | Chang | 526/160 |
| 6,849,695 | B2 * | 2/2005 | Sato | 525/392 |
| 7,534,847 | B2 * | 5/2009 | Mihan et al. | 526/348 |
| 2001/0021754 | A1 * | 9/2001 | Weber et al. | 526/65 |
| 2003/0229182 | A1 * | 12/2003 | Alarcon et al. | 525/191 |
| 2004/0063861 | A1 * | 4/2004 | Lustiger et al. | 525/240 |
| 2005/0131170 | A1 * | 6/2005 | Lai et al. | 526/126 |
| 2005/0256266 | A1 * | 11/2005 | Lustiger et al. | 525/191 |
| 2007/0255033 | A1 * | 11/2007 | Kipke et al. | 526/352 |
| 2009/0203808 | A1 * | 8/2009 | Arch et al. | 521/59 |

FOREIGN PATENT DOCUMENTS

| | | | |
|---|---|---|---|
| EP | 0089691 | | 9/1983 |
| EP | 699213 | | 3/1996 |
| EP | 699213 | A1 * | 3/1996 |
| EP | 1199161 | | 4/2002 |
| WO | 94/07930 | | 4/1994 |
| WO | WO 9428032 | A1 * | 12/1994 |
| WO | 00/68285 | | 11/2000 |
| WO | 2004/020487 | | 3/2004 |
| WO | 2005/019275 | | 3/2005 |
| WO | WO 2005103096 | A1 * | 11/2005 |

OTHER PUBLICATIONS

Frankfurt M. Fließner. Slow Crack Growth and Creep Rupture Strength of Polyethylene Pipe. Kunststoffe German Plastics, 77, 1, pp. 45-50. English Translation pp. 16-18.*
Crawford (Rotational Molding Technology. Chapter 2: Rotational Molding Polymers, Polyethylene Types, (c) 2002, Plastics Design Library/William Andrew Publishing, pp. 19-27).*
Written Opinion of the International Searching Authority dated Jul. 6, 2006.

* cited by examiner

Primary Examiner — Brieann R Fink
(74) Attorney, Agent, or Firm — Nixon & Vanderhye P.C.

(57) ABSTRACT

Copolymer of ethylene and an alpha-olefin, having a density >0.930 g/cm³, melt index (g/10 min)>4, molecular weight distribution (MWD)>3.0, and FNCT>250 hours. The copolymer is suitable for use in rotomolding applications. The copolymer possesses improved impact strength, improved permeation resistance and improved environmental stress crack resistance and may suitably be prepared by use of metallocene catalysts.

10 Claims, No Drawings

COPOLYMERS

This application is the U.S. national phase of International Application No. PCT/GB2006/001675 filed 5 May 2006 which designated the U.S. and claims priority to EP 05252850.2 filed 10 May 2005, the entire contents of each of which are hereby incorporated by reference.

The present invention relates to novel copolymers and their use for rotomoulded articles having improved properties in particular to rotomoulded articles having improved impact strength, improved permeation resistance and improved environmental stress crack resistance (ESCR) based on polyethylenes prepared using metallocene catalysts.

In a typical rotomoulding process, free flowing polymer powder is loaded into a cold cavity mould which is then spun and heated simultaneously spreading the polymer over the interior of the mould and melting it. The mould is then cooled to solidify the polymer and the resultant product is removed. The process yields medium to large hollow items for example storage tanks, refuse containers, etc.

Rotomoulding may be used to mould a number of different polymers for example polyethylene, polypropylene, polycarbonates or polyvinylchlorides. Linear low density polyethylene (LLDPE) is particular suitable for use in rotomoulding applications.

The range of melt indices of polyethylenes used for rotomoulding applications is generally limited to those in the range 3 to 10 and typically for best results polyethylenes having a narrow molecular weight distribution are preferred.

Rotomoulded articles typically have walls of uniform thickness that are generally free of orientation and weld lines and as such they are generally resistant to permeation and environmental stress cracking hence their suitability for use in large-scale chemical containment applications.

The good impact resistance of rotationally moulded articles is exploited by their use in chemical shipment containers, commercial waste bins, etc.

Polyethylenes prepared by use of traditional Ziegler-Natta catalysts have been used to produce rotomoulded articles and more recently polyethylenes prepared using metallocene catalysts have also been used.

WO 96/34898 describes the preparation of LLDPE's by use of silica supported bis(cyclopentadienyl) zirconium dichloride/methyl aluminoxane (MAO) catalyst systems having defined average particle sizes preferably in the range 10-40 μm. The polyethylenes may be prepared in either a slurry loop reactor or in a fluidised bed gas phase reactor. Rotomoulded articles were produced having a typical elongation at break (100 nm/min) of 300-400% and dart impact at −20° C. showed peak forces in the range 1480-1500 N/mm.

WO 97/32707 describes LLDPE's prepared from similar supported bis(cyclopentadienyl) zirconium dichlorides and MAO in the gas phase resulting in polymers containing 0.1-2 ppm zirconium and exhibiting $I_{10}/I_2$−4.63 less than Mw/Mn. When rotomoulded the polymers formed ductile articles either for shorter times or over broader range of times than that required to rotomould ductile articles made from polymers with similar melt index and density but prepared with non-metallocene catalysts. The use of such LLDPE's allows for greater process flexibility and rotomoulded articles having mechanical integrity or impact resistance.

WO 03/091294 describes rotomoulded articles prepared from polyethylenes exhibiting reduced shrinkage and warpage. The polyethylenes are prepared from specific metallocene catalyst systems comprising bis(indenyl) metallocenes or bis(n-butylcyclopentadienyl) metallocenes. The polyethylenes used typically are high density polyethylenes (HDPE) of density preferably in the range 0.925-0.945 g/cm³ and melt flow index from 2.0 to 20 g/10 min. The HDPE's are preferably prepared in a slurry polymerisation process using a continuous loop reactor.

We have now found that polyethylenes prepared from metallocene catalyst systems may be used for rotomoulding applications resulting in articles exhibiting improved properties for example improved impact strength and improved environmental stress crack resistance (ESCR) as evidenced by superior full notched creep test (FNCT) results and improved whiteness index (WI).

Thus according to the present invention there is provided copolymers of ethylene and alpha-olefins, said copolymers having
(a) density>0.930 g/cm³,
(b) melt index (g/10 min)>4,
(c) molecular weight distribution (MWD)>3.0, and
(d) full notch creep test (FNCT)>250 hours.

The copolymers of the present invention preferably have a melt index>6.

The copolymers of the present invention preferably have a molecular weight distribution>3.5.

The copolymers of the present invention preferably have a FNCT of >450 hours and most preferably a FNCT of >500.

Thus according to a preferred aspect of the present invention there is provided copolymers of ethylene and alpha-olefins, said copolymers having
(a) density>0.930 g/cm³,
(b) melt index (g/10 min)>4,
(c) molecular weight distribution (MWD)>3.5, and
(d) full notch creep test (FNCT)>500 hours.

The copolymers of the present invention also exhibit an improved whiteness index (WI).

The copolymers typically exhibit a WI>40, preferably >50, more preferably >55 and most preferably >60.

The copolymers of the present invention also exhibit an improved permeation resistance.

The novel copolymers of the present invention contain amounts of long chain branching (LCB) which is typically lower than seen in earlier described polymers but is still sufficient when coupled with broadened molecular weight distribution (greater than 3) to give improved processability compared to linear polymers of narrower molecular weight distribution (less than 3) which do not contain LCB.

Activation energy of flow (Ea) is commonly used as an indicator of the presence of LCB and for the copolymers of the present invention having lower amounts of LCB, the Ea is typically in the range 28 to 45 kJ/mol.

The comonomer present in the copolymers of the present invention is not randomly placed within the polymer structure. If the comonomer was randomly placed it would be expected that the elution trace derived from temperature rising elution fractionation (TREF) would show a single narrow peak and the melting exotherm as measured by differential scanning calorimetry would also show a substantially single and narrow peak.

The comonomer, in the copolymers of the present invention, may be placed in a way as to give a distinct broadening of the TREF elution data often with the appearance of several peaks representing a heterogeneity in the amount of comonomer incorporated in the polymer chain.

The amount of comonomer measured as a fraction of the molecular weight by GPC/FTIR for the copolymers of the present invention typically shows an increase as molecular weight increases. The associated parameter, the comonomer partitioning factor; $C_{pf}$ is greater than 1.1 and represents copolymers having a reverse comonomer distribution.

The Composition Distribution Branch Index (CDBI) of the copolymers is typically between 55 and 75% reflecting the fact that the polymers are neither highly homogeneous (CDBI>about 90%) or highly heterogeneous (CDBI<about 40%).

Techniques for the measurement of the above mentioned parameters may be found in our earlier publications WO 97/44371 and WO 00/68285 the relevant parts of which are incorporated herein by reference.

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The copolymers of the present invention may suitably be prepared by use of a metallocene catalyst system comprising, preferably a monocylcopentadienyl metallocene complex having a 'constrained geometry' configuration together with a suitable cocatalyst.

Examples of monocyclopentadienyl or substituted monocyclopentadienyl complexes suitable for use in the present invention are described in EP 416815, EP 418044, EP 420436 and EP 551277.

Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

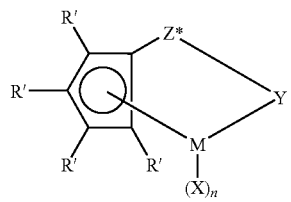

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms,
Y is —O—, —S—, —NR*—, —PR*—,
M is hafnium, titanium or zirconium,
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system,
and n is 1 or 2 depending on the valence of M.

Examples of suitable monocyclopentadienyl complexes are (tert-butylamido) dimethyl (tetramethyl-$\eta^5$-cyclopentadienyl) silanetitanium dichloride and (2-methoxyphenylamido) dimethyl (tetramethyl-$\eta^5$-cyclopentadienyl) silanetitanium dichloride.

Particularly preferred metallocene complexes for use in the preparation of the copolymers of the present invention may be represented by the general formula:

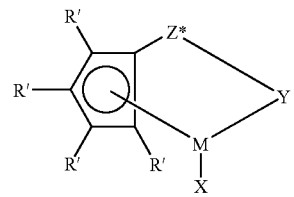

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C$_5$R'$_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R″)— or —P(R″)— wherein R″ is C$_{1-10}$ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-η$^5$-cyclopentadienyl) dimethyl silanetitanium-η$^4$-1,3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

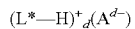

wherein

L* is a neutral Lewis base (L*—H)$^+_d$ is a Bronsted acid

A$^{d-}$ is a non-coordinating compatible anion having a charge of d$^-$, and d is an integer from 1 to 3.

The cation of the ionic compound may be selected from the group consisting of acidic cations, carbonium cations, sylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris (pentafluorophenyl)(4-hydroxyphenyl)borate Examples of suitable cations for this type of cocatalyst include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred cocatalysts of this type are alkylammonium tris(pentafluorophenyl)4-(hydroxyphenyl)borates. A particularly preferred cocatalyst is bis(hydrogenated tallow alkyl)methyl ammonium tris(pentafluorophenyl)(4-hydroxyphenyl)borate.

With respect to this type of cocatalyst, a preferred compound is the reaction product of an alkylammonium tris(pentafluorophenyl)-4-(hydroxyphenyl)borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica Suitable silicas include Ineos ES70 and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 100° C. and preferably at 200 to 850° C. in an inert atmosphere under reduced pressure.

The porous supports are preferably pretreated with an organometallic compound preferably an organoaluminium compound and most preferably a trialkylaluminium compound in a dilute solvent.

The support material is pretreated with the organometallic compound at a temperature of −20° C. to 150° C. and preferably at 20° C. to 100° C.

Suitable catalysts for use in the preparation of the novel copolymers of the present invention are suitably described in WO 04/020487 and WO 05/019275.

The novel copolymers of the present invention may suitably be prepared in processes performed in either the slurry or the gas phase.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

The novel copolymers are most suitably prepared in a gas phase process.

Gas phase processes for the polymerisation of olefins, especially for the homopolymerisation and the copolymerisation of ethylene and α-olefins for example 1-butene, 1-hexene, 4-methyl-1-pentene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process.

The novel copolymers of the present invention may be suitably prepared by the copolymerisation of ethylene with alpha-olefins.

The preferred alpha-olefins are 1-butene, 1-hexene, 4-methyl-1-pentene and 1-octene. The most preferred alpha-olefin is 1-hexene.

Thus according to another aspect of the present invention there is provided a method for the preparation of copolymers of ethylene and alpha-olefins having
  (a) density>0.930 g/cm$^3$,
  (b) melt index (g/10 min)>4,
  (c) molecular weight distribution (MWD)>3.0, and
  (d) full notch creep test (FNCT)>250 hours.
said method comprising copolymerising ethylene and said alpha olefins in the presence of a catalyst system as hereinbefore described.

The copolymers of the present invention are particularly suitable for rotational moulding applications.

The rotomoulding process involves the placing of a premeasured quantity of the raw material (e.g., polyethylene granule or powder) inside a split metal mould, closed, clamped and then passed into an oven chamber. The mould is heated externally to a high temperature and then rotated for a preset period of time around two (or three) axes, to evenly distribute the melting material around the inner surface of the mould. The mould is removed from the oven and transferred to a cooling chamber whilst continuing to rotate, and when cool, the moulded part is extracted from the mould for the process to begin again. Cycle time can vary from 20 minutes to one hour. The plastic is formed without pressure and as a result has no moulded in stresses.

Thus according to another aspect of the present invention there is provided rotomoulded articles comprising copolymers of ethylene and alpha-olefins as hereinbefore described.

Use of the novel copolymers of the present invention for rotomoulding applications results in articles exhibiting improved properties for example improved impact strength, improved permeation resistance and improved environmental stress crack resistance (ESCR).

The present invention will now be further illustrated by reference to the following examples:

Abbreviations
TEA triethylaluminium
Ionic Compound A [N(H)Me(C$_{18-22}$H$_{37-45}$)$_2$][B(C$_6$F$_5$)$_3$(p-OHC6H$_4$)]
Complex A (C$_5$Me$_4$SiMe$_2$N$^t$Bu)Ti(η$^4$-1,3-pentadiene)

EXAMPLE 1

Treatment of Silica with TEA

Under continuous agitation, 1491 L of isohexane and 397 kg of silica: D948 (available from W.R. Grace), were added to a reactor. (The silica had been previously calcined under nitrogen to reach a level of hydroxyl groups of 1.53 mmol/g). 19.3 kg of an octastat 2000 (available from Octel) solution in pentane (2 g/l) was then added and the mixture was stirred for 15 minutes. 571 kg of a 12% TEA solution in isohexane was then slowly added over 1 hour and the mixture was stirred for 1 hour further at 30° C. The slurry was filtered and thoroughly washed with isohexane before being transferred to a dryer. 19 kg of an octastat 2000 solution in pentane (2 g/l) was added and the mixture was finally dried at 60° C. under vacuum. 428 kg of silica/TEA were obtained. The aluminium content of the solid was found to be 1.3 mmol/g.

Preparation of Catalyst Component 1

To 216.9 kg of a 9.58% solution of Ionic Compound A in toluene were added over 15 minutes 17.749 kg of 11.72% TEA solution in isohexane. The mixture was further stirred for 15 minutes to yield a solution of catalyst component 1.

Preparation of a Mixture of Complex A with 1-Hexene

To 52.992 kg of a 11.64% solution of Complex A in heptane were added 47.81 kg of 1-hexene.

Preparation of the Supported Catalyst 288 kg of the above prepared silica/TEA was introduced into a reactor.

The above prepared solution of catalyst component 1 was fed to the reactor over 45 minutes and the mixture was then stirred for further 30 minutes.

The contents of the reactor were then cooled to 15° C. and the above prepared solution of Complex A and 1-hexene was fed over a period of 30 minutes, and then the mixture was further stirred for 1 hour. During the addition the internal temperature increased to a maximum of 23° C.

34 kg of an octastat 2000 solution in pentane (2 g/l) was then added and the mixture was dried at 45° C. until the residual solvent content in the catalyst was <1%. Analysis of the resulting dry powder showed the titanium content to be 44.0 μmol/g, the boron content to be 53.7 mmol/g and the aluminium content to be 1.02 mmol/g.

EXAMPLE 2

Treatment of Silica with TEA

Under continuous agitation, 110 L of hexane and 10 kg of silica D948 (available from W.R. Grace), were added to a reactor. (The silica had been previously calcined under nitrogen to reach a level of hydroxyl groups of 1.53 mmol/g and was purged 3 times with Nitrogen). 1 L of an octastat 2000 (available from Octel) solution in pentane (2 g/l) was the added and the mixture was stirred for 5 minutes. 36 L of a 0.5M TEA solution in pentane was then slowly added over 30 minutes and the mixture was stirred for 1 hour further at 30° C.

The slurry was thoroughly washed with hexane before being transferred to a dryer. 1 L of an octastat 2000 solution in pentane (2 g/l) was added and the mixture was finally dried at 60° C. under vacuum.

Preparation of Catalyst Component 1

To 8.57 kg of a 9.58% solution of Ionic Compound A in toluene were added over 15 minutes 1.44 L of a 0.5 M/l solution of TEA in pentane. The mixture was further stirred for 15 minutes to yield a solution of catalyst component 1.

Preparation of a Mixture of Complex A with 1-Hexene

To 2.07 kg of a 11.64% solution of Complex A in heptane were added 1.9 kg of 1-hexene.

Preparation of the Supported Catalyst

The above prepared solution of catalyst component 1 was fed to the reactor containing the above prepared silica/TEA over 45 minutes and the mixture was then stirred for further 30 minutes.

The above prepared solution of Complex A and 1-hexene was then fed over a period of 30 minutes, and then the mixture was further stirred for 1 hour. 1 L of an octastat 2000 solution in pentane (2 g/l) was then added and the mixture was dried at 45° C. until the residual solvent content in the catalyst was <1%. Analysis of the resulting dry powder showed the titanium content to be 44.0 μmol/g, the boron content to be 50 μmol/g and the aluminium content to be 1.02 mmol/g.

Polymerisation.

Copolymerisation of ethylene and 1-hexene was carried out using catalysts prepared in Example 1 or Example 2 in a gas phase fluidised bed reactor of diameter 0.74 meters. The process conditions were as follows:

|  | Example 1 | Example 2 |
|---|---|---|
| Bed height (m) | 5.5 | 5.4 |
| Total Pressure (bar) | 20.26 | 20.31 |
| Temperature (° C.) | 84.9 | 84.8 |
| Ethylene Pressure (Bar) | 13.06 | 13.56 |
| Pentane (bar) | 1.0 | 1.0 |
| Stadis 425 (ppm)* | 10 | 10 |
| $H_2/C_2$ ratio | 0.00285 | 0.00339 |
| $C_6/C_2$ ratio | 0.0367 | 0.0468 |
| Productivity (gPE/g catalyst) | 3500 | 3200 |

The properties of the copolymers of the invention together with those for comparative resins are given below in Table 1. The properties were obtained by use of the following procedures:

Density was measured according to ISO 1183

Melt Index was measured according to (ISO 1133)

Gel Permeation Chromatography Analysis for Molecular Weight Distribution (Mw/Mn) Determination Apparent molecular weight distribution and associated averages, uncorrected for long chain branching, were determined by Gel Permeation Chromatography using a Waters 150CV, with 4 Waters HMW 6E columns and a differential refractometer detector. The solvent used was 1,2,4 Trichlorobenzene at 135° C., which is stabilised with BHT, of 0.2 g/liter concentration and filtered with a 0.45 μm Osmonics Inc. silver filter. Polymer solutions of 1.0 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters $k_{ps}=1.21\times10^{-4}$, $\alpha_{ps}=0.707$, $k_{pe}=3.92\times10^{-4}$, $\alpha_{pe}=0.725$. The calibration curve $Mw_{PE}=f(V)$ was then fitted with a first order linear equation. All the calculations are done with Millennium 3.2 software from Waters.

The very low molecular weight fractions (below 1000 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

Full notched creep test (FNCT) was measured according to ISO 16770 (2004) as follows:

Sample Preparation

Test specimens for material testing are prepared from compression moulded sheet. Sample sheets were compression moulded in accordance to ISO 293 standard, where a cavity mould is used to control the sheet thickness. The sheet is heated at a temperature (typically at 180° C.) depending on the material viscosity, and held at this temperature for approximately 5 minutes per 2 mm of the thickness, i.e. 15 minutes for moulding and injection grade (sample thickness of 6 mm). After 10 minutes of heating at the set temperature, a pressure of 50 bars is applied. The sheet is then cooled at room temperature at a rate of 15° C./min, and the demoulding is done at 35° C. It is then stored for 24 h at (23±2)° C. before machining into the required test specimen.

Machining of the Test Specimen

The dimensions of the test specimen are 90×6×6 mm. They are manufactured by machining with a milling tool, in accordance to ISO2818 Standard at least 24 h after moulding.

Test Specimen Notching and Conditioning

The four faces of the test specimen were notched with an automatic homemade device, with a steel razor blade, at room temperature. The razor blade thickness, angle, curvature radius are 0.2 mm, ±16° and ±5 μm respectively. The speed of notching is 0.25 mm/min. The razor blade is replaced after 4 notches. The depth of the notch is 1.00±0.01 mm. The notched test specimens were stored at (23±2)° C. according to ISO 291.

Test Environment and Procedure

The test was carried out at a temperature of (23.0±0.5)° C. in a solution (deionised water) of 2% by weight of a nonyl phenoxy (ethyleneoxy)ethanol neutral detergent (Arkopal N100®), with permanent agitation. The solution was prepared 100 hours before the test and changed after 2500 hours. A calculated load for a stress of (6.00±0.01) MPa is applied in 10 seconds. The time to failure is recorded, with a precision in the order of 0.01 hours, with the aid of a digital chronometer.

The test is accomplished on 3 test specimen for each sample at the chosen applied stress (6.00±0.01) MPa.

Calculation and Precision.

The time-to-failure for each sample is calculated from the logarithmic average of the 3 recorded times-to-failure for the 3 test specimens, by the following equation, $$\left(\frac{10^{logT1+logT2+logT3}}{3}\right)$$

T1=time-to-failure test specimen 1
T2=time-to-failure test specimen 2
T3=time-to-failure test specimen 3

Precision (1 standard deviation)=10% (i.e., if the scatter of the times-to-failure between the 3 test specimens are >10%, the whole test is repeated).

(ii) Whiteness Index (WI) was measured using a Labscan XE Spectrophotometer, in accordance to ASTM D 6290 and ASTM E 313 Standards.

The basic principle of the test method involves the illumination of a polymer resin, typically in the form of pellet (but similarly applicable for powder sample), at an incident angle of 0° by a light from an Xenon lamp of type C (corresponding to visible light) and at 2° of angle of observation, in accordance to ASTM D 6290 and ASTM E 313 Standards. The light reflected in 45° by the object is analysed by an array of 15 fibre optics, arranged in a circle around the sample; the optical system is such that it approaches closer to the most possible viewing conditions of the human eye. This type of apparatus corresponds to the Group I classification of ASTM D 6290 Standard.

The output signals are then transformed by the Spectrophotometer's electronic system and software. The whiteness index (WI) is one of the several parameters measured by the system, in accordance with the recommendations of Standards of ASTM D 6290 and ASTM E 313.

TABLE 1

|  | density (g/cm³) | melt index (g/10 min) (190° C./2.16 kg) | Mw/Mn | FNCT (hours) | WI |
| --- | --- | --- | --- | --- | --- |
| Example 1 | 0.9362 | 5.8 | 3.9 | 546 | 70 |
| Example 2 | 0.9333 | 6.8 | 3.7 | 744 | 70 |
| Borecene RM8342 | 0.9400 | 5.9 |  | 206 | 55 |
| HD3850UA | 0.9364 | 4.1 |  | 136 | 40 |
| HD3570UA | 0.9342 | 6.6 |  | 48 | 35 |

The results in Table I clearly show the improved properties of the novel copolymers of the present invention in particular the combination of FNCT and whiteness index compared with commercially available prior art materials.

EXAMPLE 3

In order to determine the improved permeation resistance properties of the copolymers of the present invention, weight loss experiments were performed on 5-liter sized fuel tanks having a wall thickness between 2.0 and 4.0 mm across the tank. The tanks comprised rotomoulded articles based on the copolymers prepared in Example 2 above. Over an eight week period tanks based on the copolymers of the present invention exhibited very low levels of gasoline loss when tested at 40° C. in accordance with European Directive 2000/8/EC (Annex 6.3.3), 70/220/EEC and 70/220/EEC. The gasoline used for the permeability (weight loss) measurement was supplied by Haltermann Products of Germany with the trade name CCEC Legislative Fuel RF-02-99 (OX Cont<0.1%). The average gasoline weight losses from these fuel tanks were 1, 2, 4 and 5 g per 24 hrs. measured respectively after 5, days, 10 days, 4 weeks and 8 weeks of continuous fuel permeability tests at 40° C. with the tanks filled with the reference RF-02-99 gasoline.

Table 2 shows the improved permeation resistance for articles made from the copolymers of Example 2 compared with commercially available materials.

TABLE 2

|  | Example 2 | Borecene RM 8343 | HD 3570UA |
| --- | --- | --- | --- |
| density (g/cm³) | 0.9333 | 0.9340 | 0.9342 |
| melt index (g/10 min) (2.16 kg/190° C.) | 6.8 | 6.0 | 6.6 |
| permeation resistance (average weight loss g/24 hr) of RE-02-99 gasoline at 40° C. after |  |  |  |
| 5 days | 1 | 5 | 10 |
| 10 days | 2 | 6 | 11 |
| 4 weeks | 4 | 6 | 10 |
| 8 weeks | 5 | 6 | 10 |

The invention claimed is:

1. A rotomoulded article comprising a copolymer of ethylene and an alpha-olefin, said copolymer having a
    (a) density>0.930 g/cm³,
    (b) melt index >4, measured at 2.16kg and 190° C.,
    (c) molecular weight distribution (MWD)>3.0,
    (d) full notch creep test (FNCT)>250 hours, measured at 23.0° C. and 6.00 MPa, and
    (e) a Composition Distribution Branch Index (CDBI) in the range 55 to 75%.

2. A rotomoulded article comprising a copolymer of ethylene and an alpha-olefin, said copolymer having a
    (a) density>0.930 g/cm³,
    (b) melt index >4, measured at 2.16kg and 190° C.,
    (c) molecular weight distribution (MWD)>3.5,
    (d) full notch creep test (FNCT)>500 hours, measured at 23.0° C. and 6.00 MPa, and
    (e) a Composition Distribution Branch Index (CDBI) in the range 55 to 75%.

3. The rotomoulded article according to claim 1 having a melt index >6.

4. The rotomoulded article according to claim 1 having a molecular weight distribution >3.5.

5. The rotomoulded article according to claim 1 having a FNCT of >450 hours.

6. The rotomoulded article according to claim 1 having a FNCT of >500 hours.

7. The rotomoulded article according to claim 1 having a whiteness index (WI) >40.

8. The rotomoulded article according to claim 2 having a whiteness index (WI) >60.

9. The rotomoulded article according to claim 2, wherein the alpha-olefin has C4-C12 carbon atoms.

10. The rotomoulded article according to claim 9 wherein the alpha-olefin is 1-hexene.

* * * * *